United States Patent Office 3,334,083
Patented Aug. 1, 1967

3,334,083
USE OF BIFUNCTIONAL NITROGEN HETEROCYCLES AS CATALYSTS IN THE SYNTHESIS OF COMPOUNDS HAVING AN AMIDE BOND
Hugo Christiaan Beyerman, Wassenaar, and Willem Maassen v. d. Brink, Schiedam, Netherlands, assignors to Organon Inc., West Orange, N.J., a corporation of New Jersey
No Drawing. Filed Feb. 17, 1964, Ser. No. 345,079
Claims priority, application Netherlands, Mar. 6, 1963, 289,895; May 20, 1963, 292,620
15 Claims. (Cl. 260—112.5)

The invention relates to a process for the preparation of compounds with an amide bond according to the general reaction scheme:

$$R'-\overset{O}{\underset{\|}{C}}-XR + HN=P \longrightarrow R'-\overset{O}{\underset{\|}{C}}-N=P$$

in which:

X = an oxygen or a sulfur atom,
R = a hydrocarbon or a substituted hydrocarbon radical,
R' = carboxylic acid residue, and
P = hydrogen, hydrazine or amine residue, the reaction being performed under the influence of a catalyst.

The preparation of compounds with an amide bond is of great significance in very many fields of chemistry.

In the first field this reaction is performed for the manufacture of peptides and proteins, particularly protein hormones, such as oxytocin, adrenocorticotrophic hormone, peptides with ACTH-activity, vasopressin and the like.

The synthesis of peptides and proteins may be performed in different manners. A possible method consists in that two amino acids or two lower peptides are reacted, when of one component the amino group is blocked and of the other the carboxyl group. Next the free carboxyl group is reacted with the free amino group for the preparation of a dipeptide, starting from two amino acids, or a polypeptide, starting from two lower peptides.

Another known method for the synthesis of compounds having an amide bond consists in the condensation of an esterified carboxylic acid with an amine. This means for the preparation of a peptide the condensation of amino acids or lower peptides, of which the amino group of one component is temporarily protected with an appropriate group, such as a benzyloxycarbonyl group, and the carboxyl radical of the other component is converted into a functional derivative thereof. This method has great disadvantages, as the low reactivity of the esters requires high reaction-temperatures, at which the components may decompose, as particularly amino acids and peptides are very sensitive to heat, and further are subject to racemization at even moderate temperatures.

A method for the preparation of amides is not only important for peptides and proteins, but also for acid amides and acid hydrazides, which are of importance as intermediates in the synthesis of other compounds, as solvents and as biologically active products.

Another region in which such a method has practical significance is in the preparation of polyamides.

Polyamides are prepared by reacting polycarboxylic acids, e.g. a dicarboxylic acid, with a polyamine, e.g. a diamine, causing couplings between the various carboxyl and amine groups while forming peptide bonds, usually by heating the components for a long time in an inert gas, mostly introgen. By preference the reaction is performed in the presence of an acid catalyst, such as p-toluenesulfonic acid.

Polyamides may also be prepared by the mutual coupling reaction of amino acids, e.g. α-amino acids, or of other acids than α-amino acids, e.g. β or ε-amino acids.

Hence this reaction is analogous to that used in the preparation of lower and polypeptides.

We have now found an improved method for the preparation of compounds having an amide bond.

According to the new process of this invention an ester of a carboxylic acid or thiolcarboxylic acid is reacted with an amino compound having an amine hydrogen in the presence of a bifunctional catalyst having a basic group and an acidic group.

More particularly, the invention relates to the preparation of acid amides illustrated by the following general equation:

$$\underset{(I)}{R'-\overset{O}{\underset{\|}{C}}-XR} + \underset{(II)}{HN=P} \xrightarrow{BAH} \underset{(III)}{R'-\overset{O}{\underset{\|}{C}}-N=P}$$

wherein:

X = an oxygen or sulfur atom,
R = a hydrocarbon or substituted hydrocarbon radical, and
BAH = the bifunctional catalyst with the acidic or electrophilic group AH and the basic or nucleophilic group B.

It is supposed that the reaction mechanism is as follows:

$$R'-\overset{O}{\underset{\|}{C}}-XR + :B{\sim}AH \longrightarrow \overset{\overset{O^{\oplus}}{\|}}{R'-C\cdots XR} \xrightarrow{HN\diagdown}$$
$$\overset{\cdots}{\underset{B^{\oplus}{\sim}AH}{\wedge}}$$
$$R'-\overset{O}{\underset{\|}{C}}-N + RXH + :B{\sim}AH$$

An alternative possibility is a concerted displacement by general base-general acid catalysis.

These supposed mechanisms are in agreement with the fact established by experiment that the position of two functional groups in the catalyst must be such that the formation of a cyclic transition state, allowing a concerted displacement, is possible.

It will be clear to an expert that these steric requirements are met if the two functional groups are not so sterically hindered by the presence of certain groups in the molecule of the catalyst that the formation of a cyclic transition state is not possible.

Catalysts as mentioned before allow bonds being broken and formed at the same time, a so-called concerted mechanism. That this synchronic mechanism is of decisive importance appears from the fact that the reaction according to the invention is not or only slightly catalysed by a compound having only one of the functional groups, or, to a slight extent only, by one that does have both functional groups, but which does not satisfy the steric requirements of the postulated transition state. To the latter group of compounds belongs for instance imidazole, to the former compounds such as pyridine, phenol, triethylamine, quinoline or pyrrole.

Compounds having in their molecule both a nucleophilic and an electrophilic group are found especially in the group of the N-heterocyclic compounds.

As examples of bifunctional catalysts to be used in the process according to the invention are mentioned: pyrazole, 4-halo-pyrazole, 4-cyanopyrazole, 4-nitropyrazole, 1,2,3-triazole, 1,2,4-triazole, 4-cyano-3,5-dimethylpyrazole, 2-mercaptoimidazole, hydantoin, 2-thiohydantoin, 3 - mercapto - 4 - methyl - 1,2,4 - triazole, 5-methyltetrazole, 2-hydroxypyridine, 2-hydroxy-6-methylpyridine, 2-mercaptopyridine, 8-hydroxyquinoline (oxine), 2-hydroxybenzimidazole, 2-mercaptobenzimidazole, 2-mercaptothiazoline and succinimide. Besides other compounds may be used, hence the relative list is not to be construed as limiting.

In the process according to the invention an ester of any organic carboxylic acid, or carbothiolic acid may be used.

In the preparation of linear or cyclic lower or polypeptides the carboxylic acid is of course an amino acid or a lower peptide, the free amino group of which may be temporarily blocked in accordance with one of the known methods.

In the preparation of polyamides an ester of an organic polycarboxylic acid, e.g. a dicarboxylic acid, such as terephthalic acid or adipic acid, is used. Adipic acid is frequently used in the condensation with hexamethylene diamine for the preparation of the known polyamide, polymer 6–6.

Polyamides may also be prepared starting from other than α-amino acids, such as ε-amino caproic acid.

Although in the conventional methods used so far for the preparation of amides the use of relatively unreactive esters was undesired on account of the low reactivity of these derivatives, it has been proved that such esters can very well be used in the present method.

To the group of these unreactive esters belong the compounds, the alcohol component of which is an aliphatic, aromatic or araliphatic group.

Usually a lower aliphatic ester is used with 1–6 carbon atoms in the alkoxy residue such as methyl, ethyl, propyl, butyl or hexyl ester, but other esters, too, are usable, such as the phenyl, benzyl or naphthyl ester.

Further may be used active esters of the relative carboxylic or carbothiolic acids.

By active esters are meant esters, the alcohol component of which (R in the foregoing formulae) has electron-attracting properties.

Among active esters are reckoned compounds having in the aliphatic, aromatic or araliphatic alcohol component R one or more electron-attracting substituents.

Electron-attracting substituents are for instance:

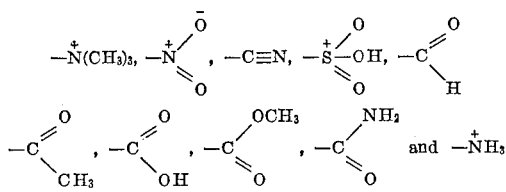

Examples of such active esters are p-nitrophenyl esters, cyanomethyl esters, thiophenyl esters, p-methanesulfonylphenyl esters, acetonyl esters and carbalkoxymethyl esters.

As amine component in the present reaction ammonia, hydrazine and any primary or secondary amine having an amino hydrogen is suitable for use.

The conversions according to the invention are usually performed in the presence of an organic solvent, which may be diluted with water. As suitable organic solvents are mentioned acetonitrile, dimethylformamide, ethyl acetate, nitromethane, tetrahydrofuran, dioxan, halogenated hydrocarbons such as carbon tetrachloride, chlorobenzene and chloroform, aliphatic ethers such as dimethyl ether, diethyl ether or methylethyl ether, and further aromatic hydrocarbons such as toluene and xylene.

The reaction period and reaction temperature depend i.e. on the nature of the reaction components, the solvent and the like, and may therefore vary greatly. But the reaction is usually performed at a temperature of from —25°–+100° and a reaction period varying from a few minutes to 100 hours, although longer reaction periods are sometimes desired, particularly if one wants to keep the reaction temperature low.

Nor is the amount of bifunctional catalyst to be added to the reaction mixture tied to strict limits, but it usually amounts to 0.01–3 molar equivalents relative to the acid ester to be converted.

The present method has some great advantages over the conventional methods used so far for the preparation of amides.

One advantage is that in general the reaction periods may be shorter and the reaction temperature lower; another that with this process the yields are appreciably higher than those obtained by the process without the addition of a bifunctional catalyst; and a further advantage that plays an important part especially in the preparation of lower peptides and polypeptides is that no or hardly any racemization occurs, which naturally influences the yield of the desired isomer favorably.

Yet another advantage of the present method is that sterically hindered compounds, which cannot or hardly be coupled in accordance with the known methods, now do give the desired condensation reaction.

The process according to the invention is illustrated further by the following examples.

EXAMPLE I

To a solution of 1.548 gm. of N-benzyloxycarbonyl-L-leucine p-nitrophenyl ester in 6 ml. of acetonitrile, cooled to 0°, a mixture was added of 0.672 gm. of glycine ethyl ester, HCl, 0.7 ml. of triethylamine and 6 ml. of acetonitrile, also cooled to 0°. After standing for 5 minutes at 0° the mixture was poured out into 1 N HCl, taken up in ethyl acetate, washed with 1 N HCl, water, 1 N-ammonia, 1 N HCl, water, 5% NaHCO$_3$, and water. After drying on MgSO$_4$, the mixture was evaporated to a few ml., whereupon an excess of petroleum ether was added. After cooling to —30° 1 gm. of product was obtained, from which no dipeptide could be isolated.

The coupling performed as stated above, but with the addition of 0.276 gm. of 1,2,4-triazole, yielded after crystallization from alcohol 1.167 gm. (83%) of benzyloxycarbonyl-L-leucyl-glycine ethyl ester, melting point 101–102°, $[\alpha]_D^{20}$—27.1° (c.=5, ethanol).

EXAMPLE II

Triethylamine (0.447 gm.) and glycinamide hydrochloride (0.490 gm.) were dissolved, while heating, in a mixture of 6 ml. of dimethylformamide, 0.6 ml. of water and 0.215 gm. of 2-hydroxypyridine. After cooling to room temperature, 1.285 gm. of benzyloxycarbonyl-DL-valine cyano-methylester were added. After standing for 16 hours at room temperature the solution was processed as stated in Example I. After crystallization from a mixture of ethyl acetate and petroleum ether 0.324 gm. of benzyloxycarbonyl-DL-valyl glycinamide was isolated melting point 175–177°.

EXAMPLE III

L-asparaginyl-O-t-butyl-L-threonine t-butyl ester (1.21 gm.), N-phthaloyl-L-methionine p-nitrophenyl ester (1.60 gm.) and 3-mercapto-4-methyl-1,2,4-triazole (0.215 gm.) were dissolved at room temperature in 20 ml. of dimethylformamide. After standing for 30 minutes at room temperature the reaction mixture was poured into water and then extracted with ethyl acetate. The extract was washed with water, dried by means of anhydrous sodium sulfate and the solvent removed by evaporation at reduced pressure. After trituration with ether and filtration, 1.56 gm. of N - phthaloyl - L - methionyl-L-asparaginyl-O-t-butyl-L-threonine t-butyl-ester, melting point 160–163°, could be obtained from the oily residue.

EXAMPLE IV

N-phthaloyl-L-leucine p-nitrophenylester (0.310 gm.), L - methionyl-L-asparaginyl-O-t-butyl-L-threonine t-butyl ester (0.320 gm.), and 0.295 gm. of 2-mercaptoimidazole were dissolved in 10 ml. of dimethylformamide. The reaction mixture was kept at room temperature for 30 minutes. Next it was poured into water and extracted several times with ethyl acetate. The combined extracts were dried with anhydrous sodium sulfate and the solvent removed by distillation at reduced pressure. The oily residue was chromatographed by means of a column of silicagel as described by H. C. Beyerman and J. S. Bontekoe, Rec. Trav. Chim. Pays-Bas 81 (1962) 707, to obtain 0.38 gm. of the desired tetrapeptide. The results of the analysis of the white powder with a softening point of about 80° corresponded with those calculated for N-phthaloyl-L-leucyl-L-methionyl-L-asparaginyl-O-t-butyl-L-threonine t-butylester.

The compound synthesized here is the carboxyl terminal tetrapeptide of the pancreas hormone glucagon, the N and C terminal of which are protected.

EXAMPLE V

To a solution of 0.448 gm. of cyclohexylamine in 6 ml. of acetonitrile were added 1.124 gm. of benzyloxycarbonyl-glycine cyanomethyl ester. After standing for 30 minutes at 20°, the solution was poured into N HCl, taken up in ethyl acetate and washed with N HCl, water, 5% NaHCO₃, and water. After drying with MgSO₄ the solution was evaporated in vacuo. When the residue had entirely solidified, it was pulverized and treated for 2 hours with 15 ml. of 10% KOH. The remaining benzyloxycarbonyl-glycinecyclohexylamide was filtered off, washed with water, and dried to obtain 0.140 gm. (11%), melting point 107–109°.

Two repetitions yielded 10–11%.
Two repetitions in dimethyl formamide yielded 11%.
A repetition in ethyl acetate yielded 13%.

*Results in the presence of 1,2,4-triazole*

In the presence of 0.310 gm. (1 equivalent) of 1,2,4-triazole a yield of 64% was obtained in acetonitrile; in dimethylformamide the yield amounted to 63% and in ethyl acetate 67%.

In the presence of 0.5 gm. or 0.25 equivalent of 1,2,4-triazole the yield was 57% and 53%, respectively. Addition of 0.05 equivalent and a reaction of 2 hrs. at 20° C. yielded 50% of the desired compound.

When the reaction period is extended the yields of the non-catalyzed and catalyzed conversions in acetonitrile and dimethylformamide respectively are as follows:

| Reaction period | Solvent | | |
|---|---|---|---|
| | Acetonitrile, percent | | Dimethylformamide with 1 equivalent 1,2,4-triazole, percent |
| | Without catalyst | With 1 equivalent 1,2,4-triazole | |
| 1 hour | 24 | 72 | 75.5 |
| 5 hours | 52 | 83 | 84.5 |
| 16 hours | 65 | 86 | 85 |

After 30 minutes in the presence of one equivalent the yield of product of melting point 107–109° amounted to:

One equivalent: Percent
    Pyrazole _____ 63
    4-cyanopyrazole _____ 69
    4-nitropyrazole _____ 64
    4-cyano-3,5-dimethylpyrazole _____ 48
    2-mercaptoimidazole _____ 43
    Hydantoin _____ * 39
    2-thiohydantoin _____ * 46
    3-mercapto-4-methyl-1,2,4-triazole _____ 51
    2-hydroxypyridine _____ 61
    2-hydroxypyridine _____ * 66
    2-hydroxy-6-methylpyridine _____ * 52
    2-mercaptopyridine _____ * 47
    8-hydroxyquinoline (oxine) _____ 44
    2-hydroxybenzimidazole _____ * 40
    2-mercaptobenzimidazole _____ * 49
    2-mercaptothiazoline _____ 35
    Succinimide _____ 45

NOTE.—The reactions marked (*) were performed in dimethylformamide, the others in acetonitrile.

EXAMPLE VI

Entirely in accordance with Example V, 20% benzoyl-glycylbenzylamide, melting point 160–162°, was obtained from 1,098 gm. of benzoylglycine cyanomethyl ester and 0.539 gm. of benzylamine in 6 ml. of acetonitrile after 16 minutes at 20°.

In the presence of 344 mg. of 1,2,4-triazole the yield was 83% and in the presence of 344 mg. of 1,2,3-triazole 81%.

EXAMPLE VII

By the process described in Example V, 1.104 gm. of benzoylglycine cyanomethyl ester in 6 ml. of acetonitrile were reacted with 0.471 gm. of aniline. After standing seven days at room temperature no reaction product could be isolated, but 97% of starting material was recovered.

A repetition in the presence of 0.480 gm. of 2-hydroxy-pyridine yielded under the same conditions 21% benzoyl-glycylanilide, melting 210–211°.

EXAMPLE VIII

Reaction of 1.165 gm. of trifluoroacetyl-DL-valine cyanomethyl ester with 0.461 gm. of cyclohexylamine in 6 ml. of acetonitrile for 17 hours, at room temperature, yielded 8% of trifluoroacetyl-DL-valylcyclohexylamide, melting point 202–204°, after crystallization from ethyl acetate/petroleum ether.

In the presence of 0.510 gm. of 2-hydroxy-6-methyl-pyridine 0.8 gm. (60%) of this product was obtained in the same way.

EXAMPLE IX

N - benzyloxycarbonyl-DL-valine cyanomethyl ester (1.330 gm.) and 0.455 gm. of cyclohexylamine were dissolved in 6 ml. of acetonitrile and kept in that condition for 2.5 hours at 20°. After processing the solution in the normal manner as described in Example V an amine was obtained in 3 percent yield with melting point of 179–181°. But a repetition in the presence of 0.314 gm. of 1,2,4-triazole yielded N-benzyloxycarbonyl-DL-valylcyclohexylamide (36%) p.a.: melting point 182–183°.

In the same manner the corresponding thiophenyl ester was converted into the corresponding peptide in a yield of 35%.

EXAMPLE X

By the process described in Example V benzoylglycine thio-ethyl ester and benzylamine in dimethylformamide with a reaction time of one hour were converted into benzoylglycylbenzylamide (M.P. 161–162°) in the presence of 2-hydroxypyridine, 4-nitropyrazole or 1,2,4-triazole in yields of 62%, 61% and 58% respectively. Without a catalyst 14% of the amide with M.P. 159–160° was obtained.

EXAMPLE XI

Glycine p-nitrophenyl ester hydrobromide (0.277 gm.) in 5 ml. of acetonitrile was mixed with 0.101 gm. of triethylamine in 5 ml. of acetonitrile. To the clear solution 0.069 gm. of 1,2,4-triazole was added. After standing for a short time—about 5–10 minutes—at 20° a precipitate of polyglycine was obtained in practically theoretical yield, according to the analysis results, its high melting point and its insolubility in organic solvents.

Without the addition of triazole no polyglycine was obtained even after 30 minutes' standing.

EXAMPLE XII

A suspension of 333 mg. (=1 mmol.) of L-leucine p-nitrophenyl ester hydrobromide in 5 ml. of acetonitrile was mixed with 101 mg. (=1 mmol.) of triethylamine in 5 ml. of acetonitrile to obtain a clear yellow solution. After 3 hours' storage at 20° a precipitate began to form, which was removed by filtration after 4.5 hours, and washed first with cold acetonitrile and next with water. After drying the yield amounted to 13 mg. only; melting point 270–280°.

The same reaction was performed in the presence of 113 mg. of 4-nitropyrazole. Now a precipitate began to form after 10 minutes already. After 4.5 hours' reaction at 20° poly-L-leucine was obtained in excellent yield; melting point 270–280°.

EXAMPLE XIII

A suspension of 367 mg. (1 mmol.) of L-phenylalanine-p-nitrophenyl ester hydrobromide in 5 ml. of acetonitrile was mixed with 101 mg. (1 mmol.) of triethylamine in 5 ml. of acetonitrile to obtain a clear yellow solution. After 20 minutes' storage at 20° a precipitate began to form, which was removed by filtration after 4 hours and washed with cold acetonitrile and water. Yield: 50 mg. Melting point: 260°.

A similar reaction was performed in the presence of 93 mg. of 4-cyanopyrazole. After 6 minutes a precipitate was formed. Now poly-L-phenylalanine—melting point >260°—was obtained in excellent yield after 4 hours. This product was recrystallized from dimethylformamide, in which it practically entirely dissolved at boiling heat. The melting point was then 303–305°.

EXAMPLE XIV

A solution of 408 mg. of terephthalic acid di-p-nitrophenyl ester in 10 ml. of dimethylformamide was added to a solution of 60 mg. of ethylenediamine in 10 ml. of dimethylformamide. Next 69 mg. of 1,2,4-triazole was added to the mixture. The reaction mixture was kept at room temperature for 4 hours, after which it was filtered and washed with dimethylformamide to obtain a polymer product of terephthalic acid and ethylenediamine with a melting point of over 260° C.

EXAMPLE XV t-Butylmethylcarbonate (100 g.) was heated under reflux with 100 g. of hydrazine hydrate in 500 ml. of dioxan during three days. Water was then added and the solution extracted with ether. The ethereal solution was dried with anhydrous magnesium sulfate and filtered. The yield of t-butylcarbazate was determined by adding an excess of benzaldehyde to an aliquot sample of the ethereal solution and weighing of the dried precipitate of the benzal derivative (M.P. 182–183°). The yield of t-butylcarbazate obtained, upon removal of the ether, by distillation under reduced pressure (B.P. 65°/1 mm.) agreed with the estimation and characterization via the benzal derivative.

A yield of 35% of t-butylcarbazate was obtained. An analogous experiment but with the addition of an equivalent of 4-nitropyrazole gave a yield of 49%. The addition of an equivalent of 2-hydroxypyridine gave 55% and the addition of an equivalent of 1,2,4-triazole gave 61% of t-butylcarbazate. Higher yields of t-butylcarbazate were obtained with longer reaction periods.

EXAMPLE XVI

N-benzoylglycinemethyl ester (870 mg.) and benzylamine (483 mg.) were refluxed for 16 hours in 6 ml. of acetonitrile. The reaction product was distributed between 1 N HCl and ethyl acetate, and the organic layer successively washed with water, a solution of 5% NaHCO$_3$, and water, dried with magnesium sulfate and evaporated to dryness in vacuo.

The crystalline residue was treated for 2 hours with 15 ml. of 10% KOH, after which the remaining benzoylglycylbenzylamide was filtered off, washed with water and dried. Yield: 60 mg. (5%); melting point: 159–161°.

Yield in the presence of one equivalent of the following compounds, but otherwise in identical reaction conditions:

| | Percent |
|---|---|
| 1,2,4-triazole | 53 |
| 1,2,3-triazole | 49 |
| 2-hydroxypyridine | 43 |

In the presence of one equivalent of imidazole the yield amounted to 6% only, hence equal to that without the addition of a bifunctional compound.

Extension of the reaction period to 67 hours yield 25% without the addition of a catalyst, while by the addition of one equivalent of 1,2,4-triazole a yield was obtained of 73%.

In the same manner N-benzoylglycine ethyl ester and cyclohexylamine, were converted into benzoylglycylcyclohexylamide in the presence of 4-cyanopyrazole. Yield: 49%.

Furthermore N-phthaloyl-L-leucine methyl ester and cyclohexylamine, and N-benzoyloxycarbonylglycine ethyl ester and the corresponding thiophenyl ester with glycinamide were converted into the desired coupling products in the presence of 1,2,4-triazole, 4-nitropyrazole and 2-hydroxypyridine in yields varying from 48–57% (reaction period 16 hours).

EXAMPLE XVII

To a solution of 0.46 gm. of aniline in 6 ml. of acetonitrile were added 1.098 gm. of benzoylglycine methyl ester. The mixture was refluxed for 7 days, after which it was poured into 1 N HCl, taken up in ethyl acetate and washed with 1 N HCl, water, 5% sodium bicarbonate and water. No reaction product could be isolated.

The addition of 0.35 gm. of 2-hydroxypyridine, 0.36 gm. of 1,2,3-triazole or 0.38 gm. of 4-cyanopyrazole yielded the benzoylglycylanilide (19–22%); melting points: 210–211° C.

EXAMPLE XVIII

A solution of 198 gm. of terephthalic acid methylester in 6 ml. of dimethylformamide was added to a solution of 29 mg. of ethylene diamine in 5 ml. of dimethylformamide. Next 35 mg. of 1,2,4-triazole were added to the mixture. The reaction mixture was kept at 90° C. for 8 hours, after which it was filtered off and washed with dimethylformamide to obtain a polymer product of terephthalic acid and ethylene diamine; melting over 260° C.

Hereafter follow also some examples from which it appears that in the preparation of peptides application of bifunctional catalysts according to the invention causes no or hardly any racemization unlike the use of imidazole.

EXAMPLE XIX

N - benzyloxycarbonyl - L - phenylalanine - nitrophenyl ester and L-valine-t-butyl ester were dissolved in ethyl acetate, after which the solution was kept at this temperature during 23 hours.

The reaction was performed either in the presence of 1,2,4-triazole or imidazole and worked up in the usual way.

Results:
Triazole→0.45% D-phenylalanine-L-valine
Imidazole→2.76% D-phenylalanine-L-valine.

EXAMPLE XX

Peptide synthesis performed with N-benzyloxycarbonyl-L - leucine - L - phenylalanine - p - nitrophenyl ester and L-valine-t-butylester at 30° C. in acetonitrile in the presence of different bifunctional catalysts according to the invention and with the known catalyst imidazole yielded tripeptides in which phenylalanine appeared to be racemized as indicated in the following table:

| Catalyst 1 Mol | Reaction time | D-Phe-L-Val, percent |
|---|---|---|
| Imidazole | 21 | 4.8 |
| 1,2,4-triazole | 21.5 | 1.8 |
| 4-nitropyrazole | 21 | 1.6 |
| 4-bromopyrazole | 21.5 | 2.3 |
| 2-hydroxypyridine | 21 | 1.7 |

As appears from the above table imidazole causes much more racemization than the bifunctional catalysts according to the invention.

From the synthesis of N-trifluoroacetyl-L-valyl-L-valine-methyl ester by condensation of N-trifluoroacetyl-L-valine-vinyl ester and L-valine-methyl ester the influence of imidazole or 1,2,4-triazole on catalysis and racemization has been examined.

The results are given in the following table:

| Catalyst | Temp. (° C.) | Time (hrs.) | Yield, percent | D-Val-L-Val, percent |
|---|---|---|---|---|
| Imidazole (10 mmol) | 20 | 90 | 53 | 13 |
| 1,2,4-triazole (10 mmol) | 20 | 90 | 61 | <1 |
| 1,2,4-triazole (16 mmol) | 35 | 65 | 94 | <1 |

We claim:

1. Process for the conversion of an ester of a member selected from the group consisting of a carboxylic acid and a thiolcarboxylic acid to the corresponding amide which comprises reacting said ester with a compound selected from the group consisting of ammonia, hydrazine, and a primary amine in the presence of a bifunctional catalyst compound which is a heterocyclic organic compound with 1–4 ring nitrogens which contains both a nucleophilic group and an electrophilic group and in which the distance between these two groups corresponds with that between the carbon atom of the carbonyl group and the oxygen or sulfur atom of the ester group to form said amide.

2. Process for the conversion of an ester of a member selected from the group consisting of a carboxylic acid and a thiolcarboxylic acid to the corresponding amide which comprises reacting said ester with a compound selected from the group consisting of ammonia, hydrazine, and a primary amine in the presence of a bifunctional catalyst compound which is a heterocyclic organic compound with 1–4 ring nitrogens which contains both a nucleophilic group and an electrophilic group and in which the distance between these two groups corresponds with that between the carbon atom of the carbonyl group and the oxygen or sulfur atom of the ester, said catalyst being free from groups which would cause steric hindrance of said functional groups, to form said amide.

3. The process of claim 1 in which the reaction is carried out in an organic solvent selected from the group consisting of acetonitrile, dimethylformamide, ethyl acetate, nitromethane, tetrahydrofuran, dioxan, a halogenated hydrocarbon, an aliphatic ether, and an aromatic hydrocarbon.

4. The process of claim 1 in which the reaction is carried out at a temperature between about −25° C. and about 100° C.

5. The process of claim 1 in which the amount of the catalyst is from about 0.01 to about 3 molar equivalents relative to the ester to be converted.

6. The process of claim 1 in which the catalyst is an N-heterocyclic compound containing from 1 to 4 ring nitrogens.

7. The process of claim 1 in which the carboxylic acid is selected from an amino acid and an N-protected amino acid.

8. The process of claim 1 in which the alcohol moiety of the ester contains an electron-attracting substituent.

9. The process of claim 8 in which the ester is a cyanomethanol ester.

10. The process of claim 8 in which the ester is a p-nitrophenyl ester.

11. The process of claim 8 in which the ester is a thiolester.

12. The process of claim 11 in which the ester is a thiophenyl ester.

13. The process of claim 1 in which the ester is a lower aliphatic hydrocarbon ester containing from 1 to 6 carbon atoms.

14. The process of claim 13 in which the ester is the methyl ester.

15. The process of claim 1 in which the carboxylic acid ester is a terephthalate.

References Cited

UNITED STATES PATENTS 2,978,444  4/1961  Schwyzer et al. ____ 260—112.5

OTHER REFERENCES

Schroder et al.: The Peptides, vol. 1, Academic Press, New York, 1965, pp. 114–118, QD 431, D 47.

LEWIS GOTTS, *Primary Examiner.*

M. M. KASSENOFF, P. A. STITH, *Assistant Examiners.*